US012601123B2

(12) United States Patent
Carda

(10) Patent No.: US 12,601,123 B2
(45) Date of Patent: Apr. 14, 2026

(54) STATE OF COMPACTION INDICATION

(71) Applicant: Caterpillar Paving Products Inc.,
Brooklyn Park, MN (US)

(72) Inventor: Timothy M. Carda, Big Lake, MN
(US)

(73) Assignee: Caterpillar Paving Products Inc.,
Brooklyn Park, MN (US)

( * ) Notice: Subject to any disclaimer, the term of this
patent is extended or adjusted under 35
U.S.C. 154(b) by 90 days.

(21) Appl. No.: 18/805,797

(22) Filed: Aug. 15, 2024

(65) Prior Publication Data

US 2026/0049453 A1 Feb. 19, 2026

(51) Int. Cl.
| | |
|---|---|
| *B60Q 9/00* | (2006.01) |
| *B60Q 5/00* | (2006.01) |
| *E01C 19/28* | (2006.01) |
| *E01C 23/01* | (2006.01) |

(52) U.S. Cl.
CPC ............ *E01C 19/288* (2013.01); *B60Q 5/005*
(2013.01); *B60Q 9/00* (2013.01); *E01C 23/01*
(2013.01); *E01C 2301/00* (2013.01)

(58) Field of Classification Search
CPC .... E01C 19/288; E01C 23/01; E01C 2301/00;
B60Q 5/005; B60Q 9/00
See application file for complete search history.

(56) References Cited

U.S. PATENT DOCUMENTS

| | | | |
|---|---|---|---|
| 6,619,125 B2 | 9/2003 | Laugwitz | |
| 9,207,157 B2 * | 12/2015 | Frelich | E01C 19/288 |
| 9,476,168 B2 | 10/2016 | Oetken et al. | |
| 9,863,112 B2 | 1/2018 | Laugwitz | |
| 10,690,579 B2 | 6/2020 | Laugwitz | |
| 2016/0237630 A1 * | 8/2016 | Aho | E01C 19/288 |
| 2021/0404812 A1 | 12/2021 | Yuasa | |
| 2023/0220645 A1 | 7/2023 | Doy et al. | |

FOREIGN PATENT DOCUMENTS

| | | |
|---|---|---|
| CN | 116380169 A | 7/2023 |
| DE | 202004015141 U1 | 12/2004 |

* cited by examiner

*Primary Examiner* — Bao Long T Nguyen

(57) ABSTRACT

A system for determining a state of compaction of a work
material during a compaction operation: a roller associated
with a machine for engaging and compacting the work
material; a power loss sensor for generating power loss
signals indicative of a power loss of the machine; a speed
sensor for generating speed signals indicative of a speed of
the machine; and a controller that: receives an actual drive
power target value, receives the power loss signals from the
power loss sensor, receives the speed signals from the speed
sensor, determines a gross power of the machine based on
the power loss signals, determines a friction loss power of
the machine based on the speed signals, and determines an
actual drive power of the machine based on the gross power
and the friction loss power, the actual drive power corre-
sponding to the state of compaction of the work material.

20 Claims, 7 Drawing Sheets

STATE OF COMPACTION INDICATION

TECHNICAL FIELD

The present disclosure generally relates to machines that compact material, and more particularly, to systems, methods, and controllers for determining a state of compaction of a work material of a work surface.

BACKGROUND

Compacting machines or compactors are commonly used to compact work materials (such as soil, gravel, asphalt) to a desired density while constructing buildings, highways, parking lots, and other structures. In addition, compactors are often used to compact recently moved and/or relatively soft materials at mining sites and landfills. The compaction process often requires a plurality of passes over the work material to reach a desired density.

Determining whether the desired level of compaction has been reached is often estimated in a variety of manners. In some instances, the compaction may be approximated by a state of compaction system that measures the amount of power required to move the compactor along the surface of a work site. The state of compaction system may determine a state of compaction relative to an absolute scale or a maximum amount of compaction. However, numerous variable may affect the results of the state of compaction system, including whether a vibration system is used with the compactor, the composition of the material to be compacted, the thickness of the material to be compacted, the width of the compaction surface, rolling resistance of the compactor, the state of the tires of the compactor, etc.

U.S. Pat. No. 9,207,157 describes a method and apparatus for use with a compactor having a vibration system to determine the compaction performance of a material. The compaction performance may be determined as a function of the inclination and speed of the compactor, power loss from the compaction operation, and a vibration compensation factor based on vibration characteristics of the vibration system. Compaction performance may be displayed to an operator of the machine.

SUMMARY

One aspect of the present disclosure is directed to a system for determining a state of compaction of a work material during a compaction operation, the system comprising: a roller associated with a machine and configured to engage and compact the work material; a power loss sensor configured to generate power loss signals indicative of a power loss of the machine; a speed sensor configured to generate speed signals indicative of a speed of the machine; and a controller configured to: receive an actual drive power target value, receive the power loss signals from the power loss sensor, receive the speed signals from the speed sensor, determine a gross power of the machine based on the power loss signals, determine a friction loss power of the machine based on the speed signals, determine an actual drive power of the machine based on the gross power and the friction loss power, the actual drive power corresponding to the state of compaction of the work material, and provide an indication to an operator of the machine upon a deviation between the actual drive power and the actual drive power target value.

Another aspect of the present disclosure is directed to a method for determining a state of compaction of a work material during a compaction operation by a machine, the machine having a roller for engaging and compacting the work material, the method comprising: receiving an actual drive power target value; receiving power loss signals indicative of a power loss of the machine; receiving speed signals indicative of a speed of the machine; determining a gross power of the machine based on the power loss signals; determining a friction loss power of the machine based on the speed signals; determining an actual drive power of the machine based on the gross power and the friction loss power, the actual drive power corresponding to the state of compaction of the work material; and providing an indication to an operator of the machine upon a deviation between the actual drive power and the actual drive power target value.

A further aspect of the present disclosure is directed to a controller for determining a state of compaction of a work material during a compaction operation by a machine, the machine having a roller for engaging and compacting the work material, the controller being configured to: receive an actual drive power target value; receive power loss signals indicative of a power loss of the machine; receive speed signals indicative of a speed of the machine; determine a gross power of the machine based on the power loss signals; determine a friction loss power of the machine based on the speed signals; determine an actual drive power of the machine based on the gross power and the friction loss power, the actual drive power corresponding to the state of compaction of the work material; and provide an indication to an operator of the machine upon a deviation between the actual drive power and the actual drive power target value.

DETAILED DESCRIPTION

The systems, methods, and controllers described herein overcome the problems of the prior art by providing an indication to an operator of a compacting machine when the state of compaction of a work material being compacted by the machine deviates from a target state of compaction. The indication can take various forms depending on, for example, a magnitude of the deviation. The indication provides the operator with the ability to maintain focus on operating the machine to carry out the compaction operation rather than on a specific state of compaction of the work material.

The systems, methods, and controllers described herein are applicable to machines 10 such as compactors that engage a work surface 102 above a work material 101 to compact the work material 101 and prepare it for a subsequent use or otherwise reduce its volume. Such systems, methods, and controllers may be used at a construction site, a roadwork site, a mining site, a landfill, or any other area in which compaction of work material 101 is desired. Work material 101 may include any material such as asphalt, gravel, soil, sand, landfill trash, and other types of material.

Figure 1:
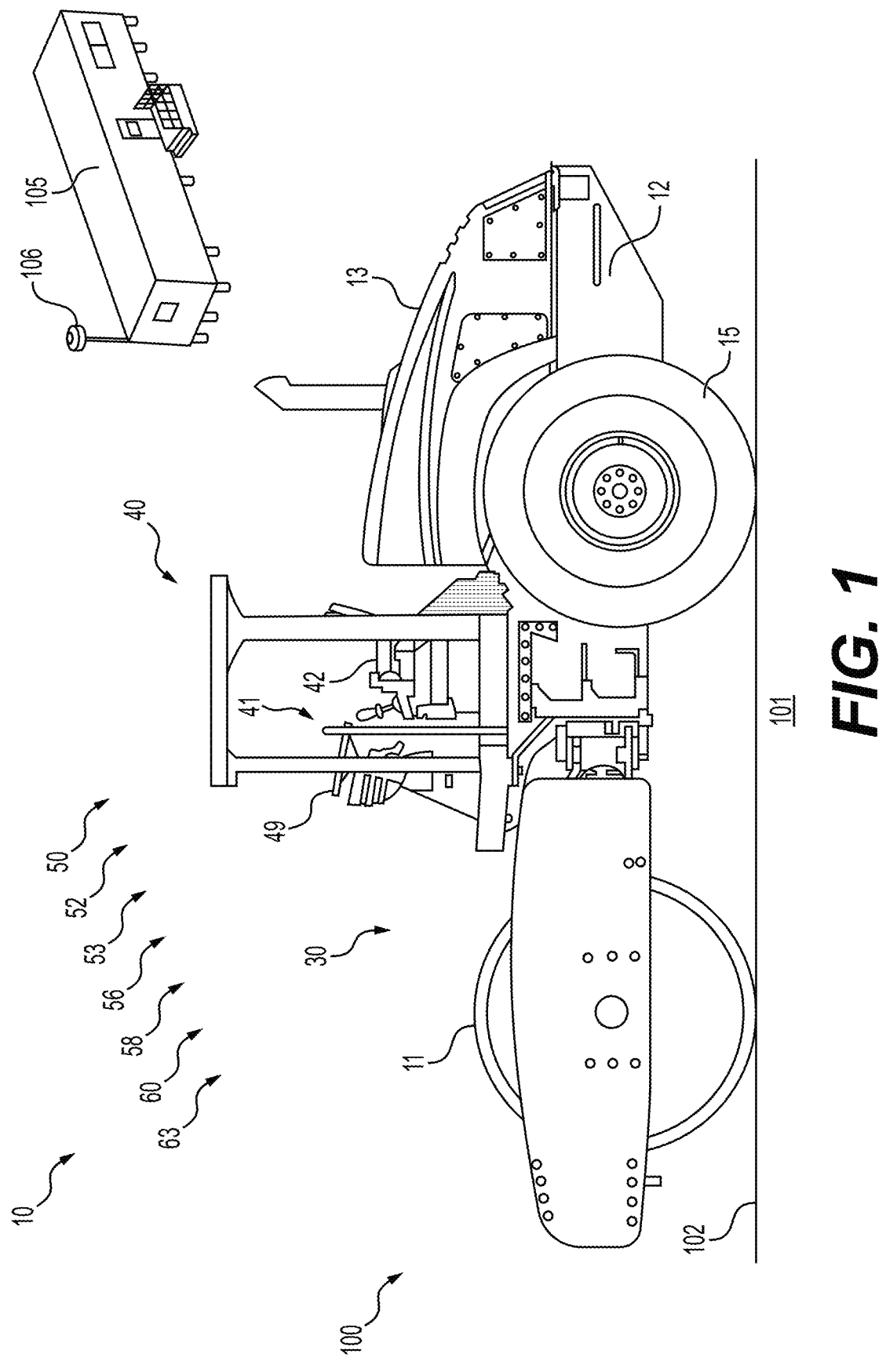
FIG. 1 shows a diagrammatic view of a machine in accordance with the present disclosure.

FIG. 1 depicts a diagrammatic illustration of a machine 10 such as a self-propelled single-drum compactor with a single cylindrical drum or roller 11 for compacting a work material 101 at work site 100. The machine 10 includes a frame 12 and a prime mover such as an engine 13. Engine 13 is a part of a drive system 14 (FIG. 2) that propels the machine 10 as desired. The systems, methods, and controllers described herein may be used with any machine propulsion and drivetrain mechanisms applicable in the art including hydrostatic, electric, or mechanical drives. The drive system 14 may operate to drive roller 11 and/or one or more deflectable tires 15.

Figure 2:
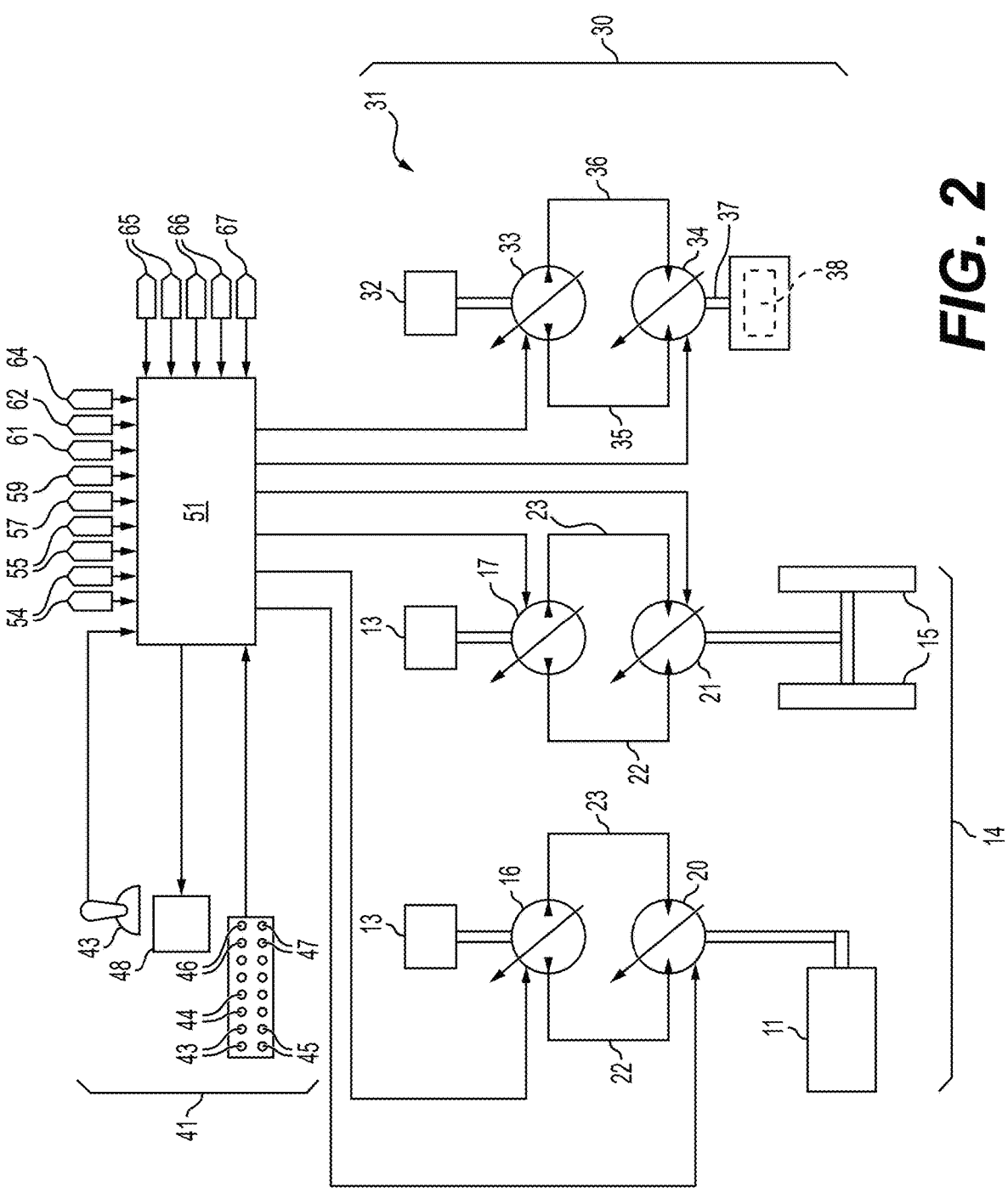
FIG. 2 shows a schematic view of an exemplary drive system, vibration system, and operator station for use with the machine of FIG. 1.

In an embodiment, drive system 14 may be a hydrostatic system in which engine 13 is operatively connected to first pump 16 and second pump 17, as shown in FIG. 2. Although a two-pump system is shown and discussed, it is contemplated that the present application is equally applicable to systems have a number of pumps other than two (e.g., a one-pump system).

Each of the first pump 16 and the second pump 17 may be operatively hydraulically connected to power first motor 20 and second motor 21, respectively, via a first hydraulic line 22 and a second hydraulic line 23. First motor 20 may be driven by pressurized hydraulic fluid from first pump 16 to rotate roller 11 and second motor 21 may be driven by pressurized hydraulic fluid from second pump 17 to rotate deflectable tires 15.

Each of first pump 16 and second pump 17 may be a variable displacement pump with the displacement controlled by controller 51. In an embodiment, signals from controller 51 may be used to control or adjust the displacement of the first pump 16 and second pump 17. First pump 16 and second pump 17 may each direct pressurized hydraulic fluid to and from their respective motors in two different directions to operate the motors in forward and reverse directions. First pump 16 and second pump 17 may each include a stroke-adjusting mechanism, for example a swashplate, the position of which is hydro- or electro-mechanically adjusted to vary the output (e.g., a discharge pressure or rate) of the pump. The displacement of each of the first pump 16 and the second pump 17 may be adjusted from a zero displacement position, at which substantially no fluid is discharged from the pump, to a maximum displacement position, at which fluid is discharged from the pump at a maximum rate. The displacement of each of the first pump 16 and the second pump 17 may be adjusted so the flow is either into its first hydraulic line 22 or its second hydraulic line 23 so that the pump may drive its respective motor in either forward and reverse directions, depending on the direction of fluid flow. Each of the first pump 16 and the second pump 17 may be operatively connected to engine 13 of machine 10 by, for example, a shaft, a belt, or in any other suitable manner.

Each of first motor 20 and second motor 21 may be driven to rotate by a fluid pressure differential generated by its respective pump and supplied through first hydraulic line 22 and second hydraulic line 23. More specifically, each motor may include first and second chambers located on opposite sides of a pumping mechanism such as an impeller, plunger, or series of pistons. When the first chamber is filled with pressurized fluid from the pump via first hydraulic line 22 and the second chamber is drained of fluid returning to the pump via second hydraulic line 23, the pumping mechanism is urged to move or rotate in a first direction (e.g., in a forward traveling direction). Conversely, when the first chamber is drained of fluid and the second chamber is filled with pressurized fluid, the pumping mechanism is urged to move or rotate in an opposite direction (e.g., in a rearward traveling direction). The flow rate of fluid into and out of the first and second chambers may determine an output velocity of the motor, while a pressure differential across the pumping mechanism may determine an output torque.

Each of first motor 20 and second motor 21 may be a variable displacement motor with the displacement controlled by controller 51. In that configuration, each motor has an infinite number of configurations or displacements. In another embodiment, each of first motor 20 and second motor 21 may be a fixed and/or a multi-speed motor. In that configuration, each motor has a finite number of configurations or displacements (e.g., two) between which the motor may be shifted. Each motor may thus operate as a fixed displacement motor with a plurality of distinct displacements.

Machine 10 may also include a vibratory or vibration system indicated generally at 30 (FIG. 1) associated with roller 11 to impart a compacting force onto the work material 101. More specifically, in addition to the weight of roller 11 and machine 10 being applied to the work material 101 to apply compressive forces, the vibration system 30 within roller 11 may operate to apply additional forces to the work material 101. As used herein, vibration system 30 includes any type of system that imparts vibrations, oscillations, or other repeating forces through roller 11 onto work material 101.

Vibration system 30 may take any desired form. In an embodiment, the vibration system 30 may utilize a hydraulic drive system 31 including a vibration system engine 32, distinct from engine 13, that is operatively connected to vibration system pump 33, as shown in FIG. 2. The vibration system pump 33 may be operatively connected to power a vibration system motor 34 via a first vibration system hydraulic line 35 and a second vibration system hydraulic line 36. Vibration system motor 34 may drive one or more rotatable vibration system shafts 37 that rotate one or more eccentrically mounted masses 38 within roller 11 to create a vibrating or oscillatory force within the roller 11 that is imparted to the work material 101.

Other manners of configuring the vibration system 30 are contemplated. For example, if desired, vibration system engine 32 may be omitted and vibration system pump 33 may be operatively connected to engine 13. Further, in other embodiments, the masses 38 may be moved by mechanical, electrical, or electro-magnetic systems. In addition, in some embodiments, the masses 38 may be moved linearly rather than eccentrically as part of a rotational system.

Returning to FIG. 1, machine 10 may include an operator station 40 from which an operator may control the machine 10. Operator station 40 may include an operator interface 41 proximate an operator seat 42 through which the operator may issue commands to control propulsion and steering systems of the machine 10, as well as operate other systems and implements associated with the machine 10. Operator interface 41 may include a plurality of input devices including a throttle input 43, a transmission input 44, a speed input 45, a vibration frequency input 46, a vibration amplitude input 47, and a steering input, as shown in FIG. 2. Each input device may take the form of a joystick, pedal, a push-button, a knob, a switch, a wheel, a yolk, or another device. The operator may manipulate the input device to effect corresponding operations of machine 10. Operator interface 41 may further include a display 48 on which various types of information useful or necessary for the operation of the machine 10 may be displayed. Additional operator input devices and displays may be included, if desired.

Throttle input 43 is depicted as a joystick that is tiltable through a range from a neutral position to one or more maximum displacement positions to generate one or more corresponding throttle input signals that are indicative of a desired percentage of the maximum speed of the machine 10 in particular directions. Throttle input 43 may be tiltable from the neutral position to a maximum displaced position in a first direction (e.g., forward) to generate a corresponding first throttle signal. Likewise, throttle input 43 may be tiltable from the neutral position to a maximum displaced position in a second direction (e.g., rearward) to generate a second throttle signal. Values of the first and second throttle signals may correspond to desired percentages of the maximum speed setting for the machine 10 in the forward and reverse directions of travel of the machine 10, respectively. In other words, the displacement of the throttle input 43 may be directly proportional to the percentage of the maximum speed of the machine 10 based on a setting or command from an operator or other personnel, or as otherwise set within the machine 10.

Transmission input 44 and speed input 45 may be used by an operator to select different modes of operation. More specifically, transmission input 44 may be a plurality of push buttons that, when pressed by the operator of machine 10, select one of any number of available transmission control settings (e.g., virtual gears or portions of a continuous range of transmission speed-to-torque ratios). For example, the operator may press a first of the push buttons to select a first gear, in which drive system 14 may operate within a highest torque output range and a corresponding lowest travel speed range. Likewise, the operator may press a second of the push buttons to select a second or higher gear, in which drive system 14 may operate with a lower torque output range and a corresponding higher travel speed range.

Speed input 45 may also be a plurality of push buttons that, when pressed by the operator of machine 10, select one of any number of maximum allowable speeds or available machine travel speed limits that correspond to the maximum displaced position of throttle input 43.

Vibration frequency input 46 and vibration amplitude input 47 may form a portion of vibration system 30. Vibration frequency input 46 may be a plurality of push buttons for establishing the frequency of vibrations imparted on the work material 101 by roller 11. More specifically, the vibration frequency input 46 may be used to set the rate at which the masses 38 move, and thus the frequency at which the roller 11 impacts the work surface 102.

Vibration amplitude input 47 may also be a plurality of push buttons for establishing the amplitude of vibrations imparted on the work material 101 by roller 11. More specifically, the vibration amplitude input 47 may be used to set the stroke of the masses 38 and thus establish the force of impact between the roller 11 and the work surface 102.

Vibration system 30 may permit an infinite number of adjustments to both the vibration frequency and vibration amplitude, or may have a predetermined number of pre-set values for either or both of the vibration frequency and the vibration amplitude. In one example, the vibration frequency may be set to low, medium, or high depending on the characteristics of the work material 101 upon which machine 10 is operating. In addition, the vibration amplitude may be set to low, medium, or high depending on the characteristics of the work material 101. In other instances, the vibration frequency and/or amplitude may be set to specific values based on the characteristics of the work material 101.

Machine 10 may include a control system 50, as shown generally by an arrow in FIG. 1 indicating association with the machine 10. The control system 50 may include an electronic control module or controller 51, various input devices to control the machine 10, and a plurality of sensors associated with the machine 10 that provide data and input signals representative of various operating parameters of the machine 10. The term "sensor" is meant to be used in its broadest sense to include one or more sensors and related components that may be associated with the machine 10 and that may cooperate to sense various functions, operations, and operating characteristics of the machine 10.

The controller 51 may be an electronic controller that operates in a logical fashion to perform operations, execute control algorithms, store and retrieve data, and perform other desired operations. The controller 51 may include or access memory, secondary storage devices, processors, and any other components for running an application. The memory and secondary storage devices may be in the form of read-only memory (ROM) or random access memory (RAM) or integrated circuitry that is accessible by the controller 51. Various other circuits may be associated with the controller 51, such as power supply circuitry, signal conditioning circuitry, driver circuitry, and other types of circuitry.

The controller 51 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine 10. The functionality of the controller 51 may be implemented in hardware and/or software without regard to the functionality. The controller 51 may rely on one or more data maps relating to the operating conditions of the machine 10 that may be stored in the memory of controller 51. Each of these data maps may include a collection of data in the form of tables, graphs, and/or equations.

The control system 50 may be located on the machine 10 and may also include components located remotely from the machine 10, such as at a command center 105, as shown in FIG. 1. The functionality of control system 50 may be distributed so that certain functions are performed at machine 10 and other functions are performed remotely (e.g., at command center 105). In such case, the control system 50 may include a communications system, such as wireless network system 106, for transmitting signals between the machine 10 and a system located remote from the machine 10 (e.g., at command center 105).

A position sensing system 56, as shown generally by an arrow in FIG. 1 indicating association with the machine 10, may include a position sensor 57 to sense a position of the machine 10 relative to the work site 100. The position sensor 57 may include a plurality of individual sensors that cooperate to provide signals to controller 51 to indicate the position of the machine 10. In one example, the position sensor 57 may include one or more sensors that interact with a positioning system, such as a global navigation satellite system or a global positioning system, to operate as a position sensor 57. The controller 51 may determine the position of the machine 10 within work site 100, as well as the orientation of the machine 10, such as its heading, pitch, and roll. In other examples, the position sensor 57 may be an odometer or another wheel rotation sensing sensor, a perception-based system, or may use other systems, such as lasers, sonar, or radar, to determine the position of the machine 10.

Machine 10 may also include a drive speed sensing system 58, as shown generally by an arrow in FIG. 1 indicating association with the machine 10. The drive speed sensing system 58 may include a speed sensor 59 for generating speed signals indicative of the speed of the machine 10. Controller 51 may utilize the speed signals to determine the speed of the machine 10 relative to work surface 102. In one example, the speed sensor 59 may be a magnetic sensor associated with second motor 21, which is used to drive the deflectable tires 15. In another embodiment, controller 51 may utilize data from the position sensing system 56 to determine the speed of the machine 10.

Machine 10 may also include an inclination sensing system 60, as shown generally by an arrow in FIG. 1 indicating association with the machine 10, for determining the inclination or pitch angle of the machine 10 relative to a level ground reference (i.e., perpendicular to the direction of gravity). The inclination sensing system 60 may include an inclination or pitch angle sensor 61 for generating inclination signals that are used by controller 51 to determine the inclination of machine 10. In some embodiments, the inclination sensing system 60 may use a pitch rate sensor 62 in addition to or instead of the pitch angle sensor 61 to determine the pitch angle of the machine 10.

Machine 10 may also include various systems and/or sensors associated with the drive system 14, the deflectable tires 15, and the vibration system 30. For example, the machine 10 may include a power loss measurement system 63 for determining the amount of power lost or used during a compaction operation of the machine 10 (i.e., a gross power). The power loss measurement system 63 may include a power loss sensor 64 for generating signals indicative of power loss of the machine 10 during a compaction operation. In an embodiment, the power loss sensor 64 may embody motor hydraulic sensors 65 (FIG. 2) to measure the difference between the hydraulic pressure within the first hydraulic line 22 and second hydraulic line 23 at the input and output of each of the first motor 20 and the second motor 21. The amount of power used to compact the work material 101 during a compaction operation may be calculated based on the change in hydraulic pressure between the input and the output of each of the first motor 20 and the second motor 21.

In another embodiment, the power loss sensor 64 may use pump hydraulic sensors 66 (FIG. 2) to measure the difference between the hydraulic pressure within the first hydraulic line 22 and second hydraulic line 23 at the input and output of each of the first pump 16 and the second pump 17. The amount of power used to compact the work material 101 during a compaction operation may be calculated based on the change in hydraulic pressure between the input and the output of each of the first pump 16 and the second pump 17, together with an estimate of line losses that occur as a result of hydraulic fluid being pumped through or along the first hydraulic line 22 and second hydraulic line 23 between each pump and its respective motor.

In still another embodiment, the drive system 14 may include a mechanical drive with a torque converter. In such case, the power loss sensor 64 may include sensors that are used to determine the input speed of the torque converter (or the output speed of engine 13) and the output speed of the torque converter. The amount of power used to compact the work material 101 during a compaction operation may be calculated based on the change in speed between the input and the output of the torque converter.

The machine 10 may also include a tire sensing system 53 for providing one or more variables associated with the deflectable tires 15 of machine 10. For example, the tire sensing system 53 may include one or more tire pressure sensors 54 to measure tire pressures of each deflectable tire 15 and/or changes in tire pressure of each deflectable tire 15. As one example, tire pressure sensor 54 could be a tire pressure monitoring sensor (TPMS) known in the art. However, the tire pressure sensor 54 could be any type of sensor used for monitoring tire pressures of a tire. In general, each deflectable tire 15 has its own associated tire pressure sensor 54 to monitor tire pressures in that specific deflectable tire 15.

Tire pressure affects the rolling resistance of a deflectable tire 15. For example, if its tire pressure is too low, a deflectable tire 15 will experience greater tire deflection, making deflectable tire 15 more difficult to roll (i.e., increasing the rolling resistance of deflectable tire 15). If the deflectable tire 15 is over-inflated, however, deflectable tire 15 will experience less deflection and therefore be easier to roll (i.e., due to a lower rolling resistance of deflectable tire 15).

The tire sensing system 53 may also facilitate the provision of tire characteristic data 55 for each deflectable tire 15 with which the machine 10 is equipped. In particular, more than one type of deflectable tire 15 can be installed on machine 10, with different deflectable tires 15 having different tire characteristics (e.g., rubber compound, tread type, bias ply, radial ply, ply rating, tire width, rolling radius, circumference, accommodated wheel size, etc.). Changes in the tire characteristics, in turn, affect the rolling resistance of the deflectable tire 15, similar to how tire pressures of a deflectable tire 15 can also affect rolling resistance.

In an embodiment, tire characteristic data 55 for each deflectable tire 15 with which the machine 10 is equipped could be used to determine a standard value for a nominal tire pressure for each deflectable tire 15. For example, the tire characteristic data 55 itself could indicate a nominal tire pressure for the selected deflectable tire 15 to be mounted on machine 10. The tire characteristic data 55 could also be used to call a standard value (e.g., from a lookup table stored in the memory of controller 51) that indicates a nominal tire pressure for the selected deflectable tire 15.

Vibration system 30 may include a hydraulic drive system 31 to impart additional force to the work material 101, as described above. Hydraulic sensor 67 may be operatively associated with the first vibration system hydraulic line 35 or the second vibration system hydraulic line 36 to determine the pressure within, or of, the relevant hydraulic line. As the work material 101 is compacted and increases in stiffness, the pressure within the hydraulic lines 35, 36 will increase even as the settings of the vibration system engine 32, vibration system pump 33, and the vibration system motor 34 remain the same.

Control system 50 may include a state of compaction system 52 for determining the level or state of compaction of work material 101 as machine 10 moves over the work surface 102. As the machine 10 moves along the work surface 102, power is used to compact the work material 101, to move the machine 10, and to overcome friction losses of the machine 10, and power is gained or lost depending on whether the machine 10 is traveling down or up a grade. The state of compaction system 52 generally operates based on the concept that less power is required to move the machine 10 across a harder or more compacted work material 101 as compared to a softer or less compacted work material 101. By determining the actual drive power (P_{Actual}) used by the machine 10 as it moves along the work surface 102 and compacts the work material 101, a relative state of compaction of the work material may be determined.

The actual drive power (P_{Actual}) may be generally represented by the equation:

$$P_{Actual} = P_{Gross} - P_{Grade} - P_{Friction} \tag{1}$$

where $P_{Gross}$ is the gross amount of power used to propel the machine 10 along the work surface 102 (i.e., the amount of power lost or used during a compaction operation of the machine 10), $P_{Grade}$ is the change in power due to the change in elevation or grade of the machine 10, and $P_{Friction}$ is the power lost due to friction associated with the machine 10 as it moves. Actual drive power $P_{Actual}$ corresponds to the amount of energy required to overcome rolling resistance and other losses caused by friction within the machine 10.

Both the tire pressure of deflectable tires 15 and the tire characteristic data 55 of deflectable tires 15 can affect $P_{Friction}$. For example, as discussed herein, if the tire pressure of one or more of deflectable tires 15 of machine 10 is low, the rolling resistance of the deflectable tires 15 increases, which in turn increases $P_{Friction}$, as more power is lost due to friction associated with the machine 10 as it moves. If the tire pressure of one or more of deflectable tires 15 of machine 10 is high, the rolling resistance of the deflectable tires 15 decreases, which in turn decreases $P_{Friction}$, as less power is lost due to friction associated with the machine 10 as it moves.

Similarly, the tire characteristic data 55 can affect $P_{Friction}$. For example, if the tire characteristic data 55 indicates that the rubber compound of the deflectable tire 15 is soft, the rolling resistance of the deflectable tires 15 will be higher than if the rubber compound is hard. Consequently, the higher rolling resistance due to a softer rubber compound of deflectable tire 15 increases $P_{Friction}$, as more power is lost due to friction associated with the machine 10 as it moves. As another example, if the tire width of the deflectable tire 15 is larger, the rolling resistance will be higher as compared to a narrower tire width. The larger tire width will therefore result in a higher rolling resistance, in turn increasing $P_{Friction}$. Other components of the tire characteristic data 55 (e.g., tread type, bias ply, radial ply, ply rating, rolling radius, circumference, accommodated wheel size, etc.) can also affect $P_{Friction}$, as is known in the art, including decreasing $P_{Friction}$:

By incorporating one or both of the tire pressure and the tire characteristic data 55 of deflectable tires 15, the calculation of $P_{Friction}$ becomes more accurate and less variable. In turn, the accuracy of equation (1) may be increased, as $P_{Friction}$ accounts for one or both of the tire pressure and the tire characteristic data 55 of deflectable tires 15.

Under some operating conditions, when operating the machine 10 together with the vibration system 30, the accuracy of equation (1) may also be reduced due to the effect of the vibration system 30 on the work material 101. For example, in some situations, operation of the machine 10 with the vibration system 30 has resulted in reduction in the calculation of the actual drive power (P_{Actual}). As a result, equation (1) may provide a first result when the vibration system 30 is in operation and a second result for the same physical location and work material characteristics when the vibration system 30 is off. As a result, a vibration compensation factor (P_{Vibe}) may be added to equation (1) to compensate for any changes due to the operation of the vibration system 30, as follows:

$$P_{Actual} = P_{Gross} - P_{Grade} - P_{Friction} + P_{Vibe} \tag{2}$$

Figure 3:
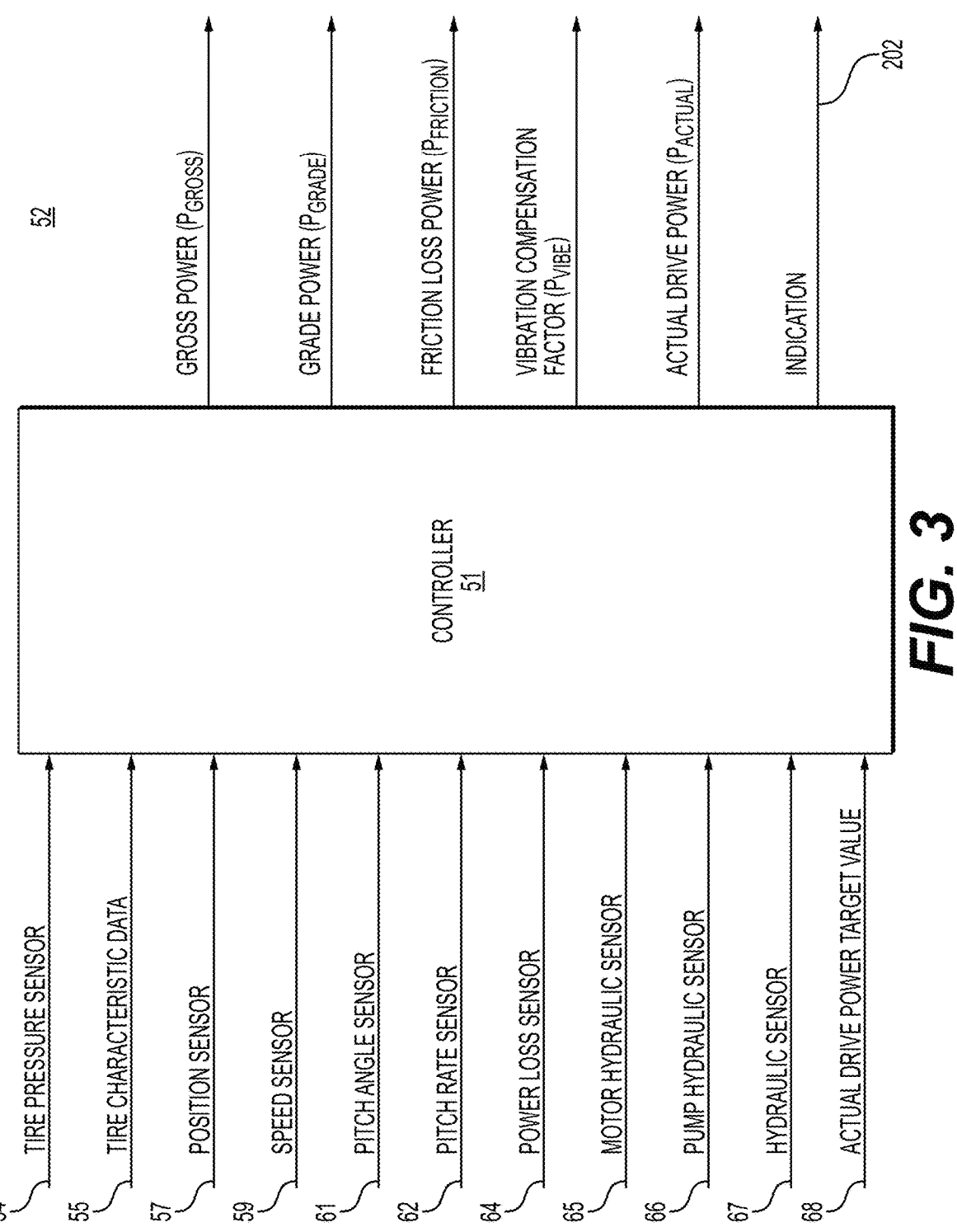
FIG. 3 shows a block diagram of state of compaction system in accordance with the present disclosure.

As depicted in FIG. 3, the controller 51 receives information and processes this information. Controller 51 may receive tire pressure signals from tire pressure sensor(s) 54 at a first node, tire characteristic data 55 at a second node, a position signal from position sensor 57 at a third node, a speed signal from speed sensor 59 at a fourth node, and inclination signals from the pitch angle signal 61 at a fifth node. If a pitch rate sensor 62 is included, the controller 51 may receive pitch rate signals from the pitch rate sensor 62 at a sixth node. At a seventh node, the controller 51 may receive signals from power loss sensor 64 indicative of power loss that occurs during a compacting operation. As described herein, the power loss sensor 64 may take any of various forms, and examples of such sensors are indicated at the eighth through tenth nodes. Different power loss sensors would not typically be used together but are depicted in FIG. 3 as examples.

Controller 51 can also receive an actual drive power target value 68. Actual drive power target value 68 corresponds to a desired state of compaction of work material 101. By incorporating actual drive power target value 68, controller 51 can determine when there is a deviation from actual drive power target value 68, and, if appropriate, notify an operator of machine 10 accordingly.

Actual drive power target value 68 may be input into controller 51 via, for example, display 48 by an operator of machine 10, command center 105 over wireless network system 106 by an operator who may be remote from site 100, etc. In one example, an actual drive power target value of 100 could correspond to a perfectly compacted work material 101. Values of actual drive power target value 68 greater than 100 could correspond to work material 101 being over-compacted, while values of actual drive power target value 68 less than 100 could correspond to work material 101 being under-compacted.

Figures 7, 8:
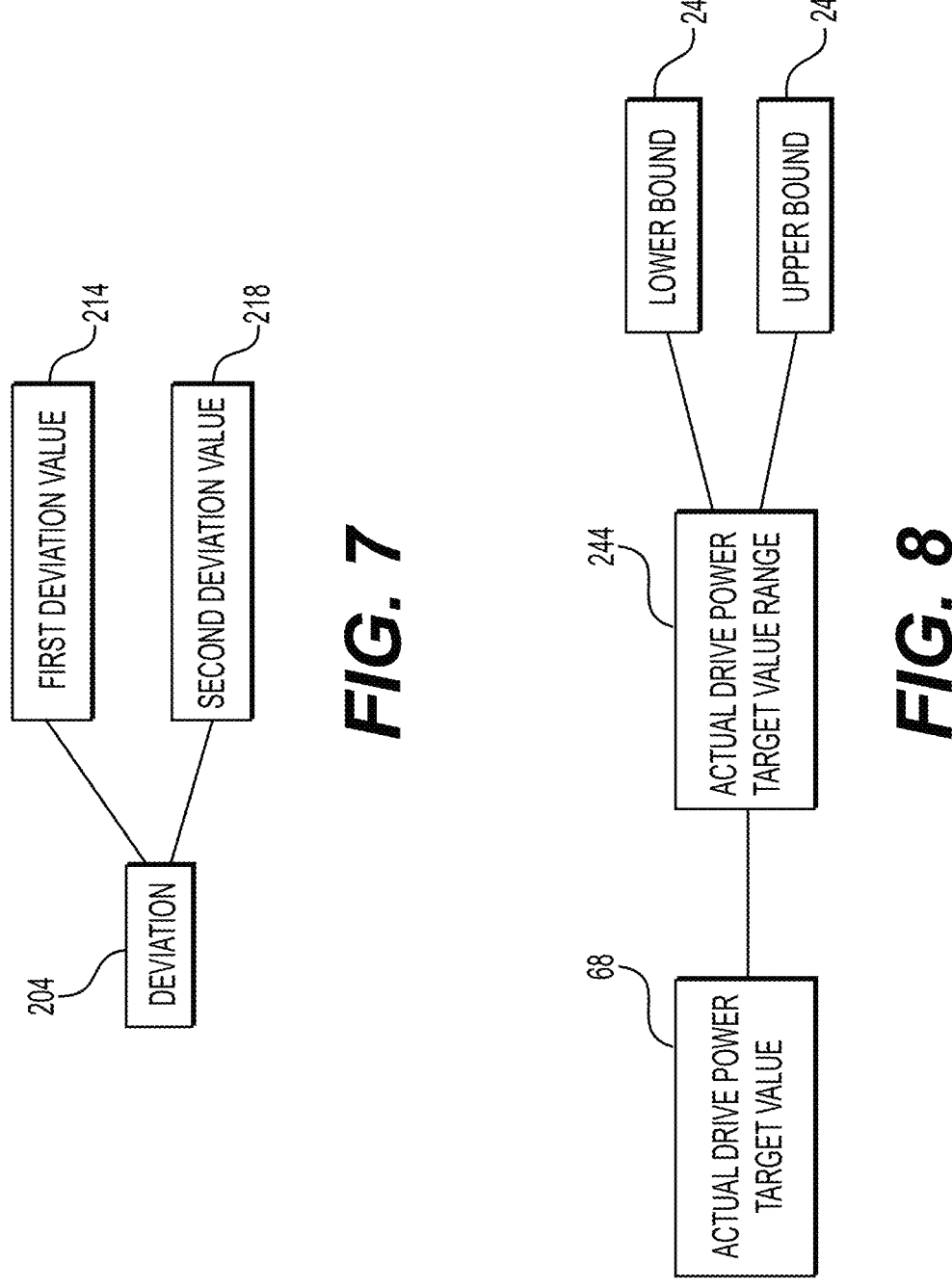
FIG. 7 shows various aspects of a deviation associated with determining a state of compaction of a work surface during a compaction operation.
FIG. 8 shows various aspects of an actual drive power target value received when determining a state of compaction of a work surface during a compaction operation.

In an embodiment, actual drive power target value 68 could be an actual drive power target range 244, as shown in FIG. 8. Actual drive power target range 244, in turn, could have a lower bound 246 and an upper bound 248, both of which could be adjustable (e.g., by an operator of machine 10 through display 48, at command center 105, etc.). Defining actual drive power target value 68 as an actual drive power target range 244 allows tolerance of smaller deviations of actual drive power target value 68 from a desired state of compaction of work material 101. Defining actual drive power target value 68 as an actual drive power target range 244 also allows for more incremental control over how an operator of machine 10 is notified when there is a deviation from actual drive power target value 68, as discussed in more detail herein.

Returning to FIG. 3, controller 51 may generate various output signals based on the operation of the state of compaction system 52. For example, at a first output node, the controller 51 may generate signals indicative of the gross amount of power used to propel the machine 10 along the work surface 102 ($P_{Gross}$). At a second output node, the controller 51 may generate signals indicative of the change in power due to the change in elevation or grade of the machine 10 ($P_{Grade}$). At a third output node, the controller 51 may generate signals indicative of the power lost due to friction associated with the machine 10 as it moves ($P_{Friction}$). As discussed herein. $P_{Friction}$ can reflect one or both of tire pressure and tire characteristic data 55 from deflectable tires 15 of machine 10. At a fourth output node, the controller 51 may generate signals indicative of a vibration compensation factor ($P_{Vibe}$) used compensate for any changes in the state of compaction system 52 due to the operation of the vibration system 30. Consequently, the controller 51 may determine the gross amount of power used to propel the machine 10 across the calibration surface ($P_{Gross}$), the change in power ($P_{Grade}$) due to the change in elevation, friction power loss ($P_{Friction}$), and/or the vibration compensation factor ($P_{Vibe}$) to generate at a fifth output node signals indicative of the actual drive power ($P_{Actual}$) used for compaction, and thus determine and display the state of compaction of the work material 101 (e.g., on display 48 and/or at command center 105).

Controller 51 may also output an indication 202 at a sixth output node. Indication 202 may help facilitate better control of the compaction operation by an operator of machine 10. In an embodiment, controller 51 will provide indication 202 upon a deviation between actual drive power ($P_{Actual}$) and actual drive power target value 68, as discussed in more detail herein. A "deviation" between actual drive power ($P_{Actual}$) and actual drive power target value 68 means that the actual drive power ($P_{Actual}$) and actual drive power target value 68 are not equal. If, however, actual drive power ($P_{Actual}$) and actual drive power target value 68 are equal, then there is no deviation. "Equal" in this sense is intended to encompass the idea that there may be a tolerance in which actual drive power ($P_{Actual}$) and actual drive power target value 68 may be considered to be essentially the same, even if the values of those quantities do not match each other in all significant figures. For example, an actual drive power ($P_{Actual}$) of 101.9 may still be considered "equal" to an actual drive power target value 68 value of 102.1, such that there is considered to be no "deviation" between those two values due to the tolerance. Such tolerance could therefore also be modifiable by an operator of the machine 10, whether via display 48 or in command center 105.

Figure 4:
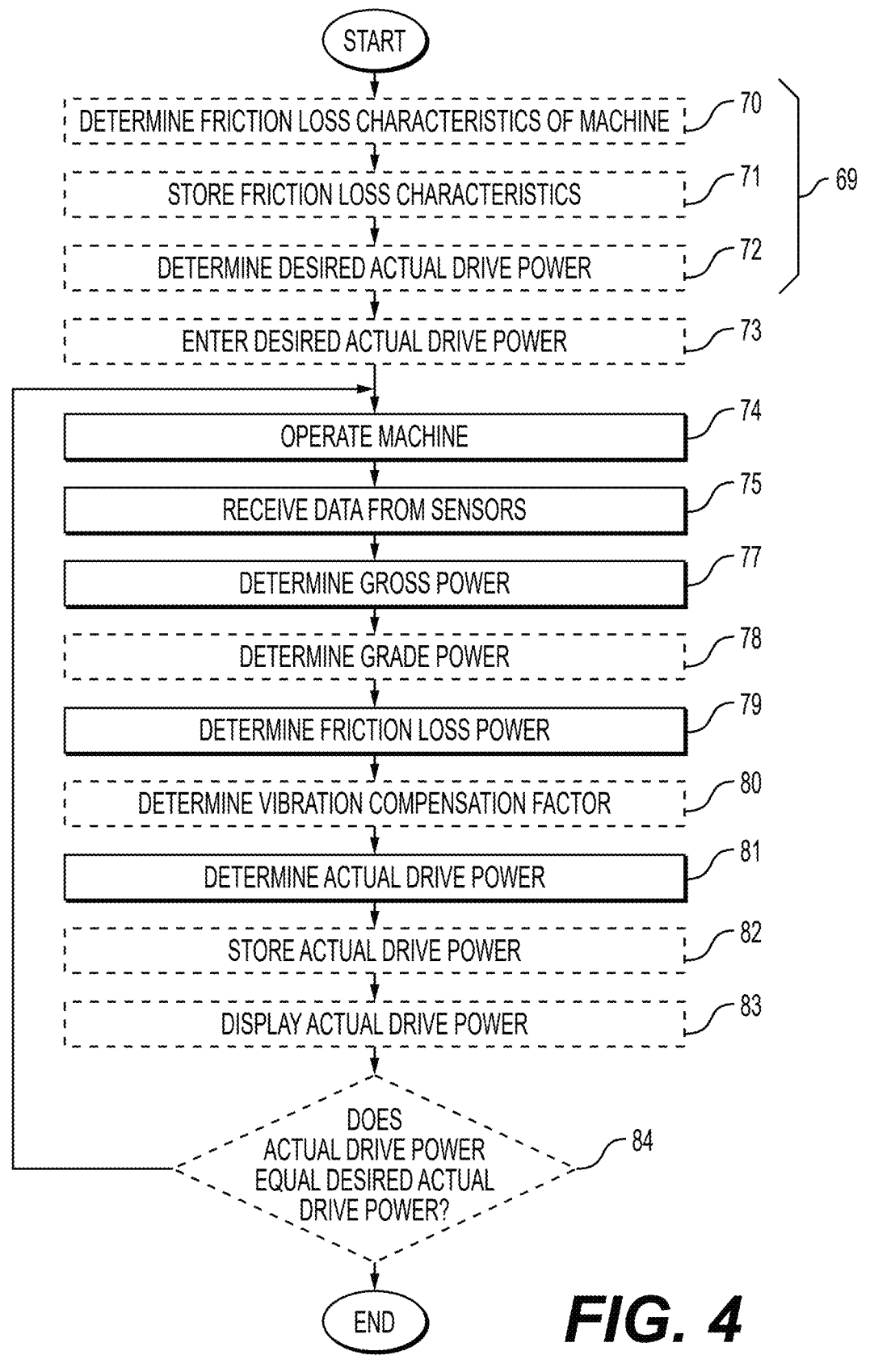
FIG. 4 shows a flowchart of a process for determining a state of compaction of a work surface during a compaction operation.

FIG. 4 depicts a process for determining a state of compaction of a work surface 102 during a compaction operation state of compaction system 52 in conjunction with the operation of machine 10. This process can begin with a calibration process 69. At stage 70 within calibration process 69, the friction loss characteristics of the machine 10 may be determined. To do so, the machine 10 is operated on a flat, hard calibration surface at various speeds without operating the vibration system 30, and the amount of power used when moving the machine 10 at the different speeds is recorded. More specifically, the machine 10 is positioned on a hard surface that does not deflect or compact under the weight of the machine 10, as would occur with a compactable work material 101. In addition, the surface upon which the machine 10 is positioned is flat so that the machine 10 is not going up or down a grade.

In stage 70 the compaction system 52 and its controller 51 can also incorporate nominal tire pressure of the deflectable tires 15 of machine 10 (e.g., the tire pressure recommended by the manufacturer of the deflectable tires 15) to account for any friction losses resulting therefrom. As a result, the power required to move the machine 10 along the calibration surface does not include any deviations from the nominal tire pressure of the deflectable tires 15. Either alternatively or in addition, in stage 70 the compaction system 52 and its controller 51 can incorporate the tire characteristic data 55 of the deflectable tires 15, which tire characteristic data 55 could be used to determine a nominal tire pressure of the deflectable tires 15, as discussed herein.

By operating the machine 10 on the flat, hard calibration surface, without operating the vibration system 30, and with the tire pressure of the deflectable tires 15 at the nominal tire pressure, the power used to compact the work material 101 (i.e., $P_{Vibe}$) goes to zero, and the power due to the machine 10 moving up or down an incline (i.e., $P_{Grade}$) also goes to zero. Equation (2) thus reduces to:

$$P_{Actual} = P_{Gross} - P_{Friction} \qquad (3)$$

As such, the power used by machine 10 as it moves along the calibration surface (i.e., $P_{Actual}$) accurately reflects a nominal power lost to friction while moving the machine 10 (i.e., $P_{friction}$), such as the rolling resistance due to deflectable tires 15 being inflated to the nominal tire pressure and/or the rolling resistance as dictated by the tire characteristic data 55, and other losses caused by friction within the machine 10.

In one example, the power lost due to friction (i.e., $P_{Friction}$) may be determined by operating the machine 10 at a series of different speeds (e.g. 1 m.p.h., 2 m.p.h., 3 m.p.h., 4 m.p.h., etc.) while using the power loss measurement system 63 to determine the amount of power required to move the machine 10 (i.e., $P_{Gross}$) at each of those speeds. Friction losses may be extrapolated for values between the tested data points. If desired, the process may be repeated for different combinations of settings of the first pump 16 and the first motor 20 and the second pump 17 and the second motor 21, and/or for different tire pressures and tire characteristic data 55 (e.g., by changing the tire pressure and/or the type of deflectable tire 15 mounted to machine 10). The calibration process 69 may be performed at any desired location, such as at a factory at which the machine 10 is manufactured. The power lost due to friction (i.e., $P_{Friction}$) generated at stage 70 may be stored within controller 51 at stage 71.

If desired, rather than calibrate each machine 10 in an optional calibration process 69, standard or generalized values of the power lost due to friction (i.e., $P_{Friction}$) may be developed, such as by averaging data from a plurality of machines 10 using certain deflectable tires 15, and such standard values may be stored within controller 51.

Next, the machine operator or other personnel may determine a desired actual drive power ($P_{Actual}$) setting or reading for a work material 101 (e.g., at a test area at work site 100, at the factory where the machine 10 is manufactured, etc.), which actual drive power ($P_{Actual}$) corresponds to a desired state of compaction of the work material 101.

In one example, at stage 72 an operator may operate the machine 10 at a test area or physical location at which the state of compaction is known to meet a desired level of compaction based on the measurement of engineering, industry and/or regulatory reporting requirements or standards. As the machine 10 moves over the area of known compaction, the state of compaction system 52 may display the actual drive power ($P_{Actual}$) on display 48 and/or at command center 105. At stage 73 the operator may then enter the actual drive power ($P_{Actual}$) into controller 51 as a desired actual drive power for operating the machine 10. In other instances, the characteristics of the work material 101 may not be stored within the controller 51.

In another example, the machine 10 may be moved repeatedly over a particular location and the actual drive power ($P_{Actual}$) displayed on display 48 and/or at command center 105. Once the actual drive power ($P_{Actual}$) becomes relatively constant, the value of the actual drive power ($P_{Actual}$) may be used as the desired actual drive power.

When the desired actual drive power ($P_{Actual}$) is known, the corresponding amount of power required to move the machine 10 (i.e., $P_{Gross}$) to achieve that actual drive power ($P_{Actual}$) can be determined using equation (3), as the power lost due to friction (i.e., $P_{Friction}$) is also known. The calibration process 69 may then be complete.

At stage 74, the machine 10 may begin a compaction operation at the work site 100. As the machine 10 operates, the controller 51 may receive data from the various sensors at stage 75. More specifically, the controller 51 may determine the tire pressure and/or tire characteristic data 55 of the deflectable tires 15 from the tire sensing system 53. The controller 51 may also determine the position of the machine 10 based on position signals from the position sensing system 56 and the speed at which the machine 10 is operating based on speed signals from the drive speed sensing system 58. In addition, the controller 51 may determine the pitch angle or inclination and/or pitch rate of the machine 10 based on inclination signals from the inclination sensing system 60. If desired, the controller 51 may also determine the pressure of the hydraulic fluid within the vibration system 30 based on signals from hydraulic sensor 67.

At stage 77, the controller 51 may determine the gross amount of power used to propel the machine 10 along the work surface 102 as the machine 10 moves about the work site 100 ($P_{Gross}$). In doing so, the controller 51 may utilize the power loss measurement system 63 as described above. In one example, the power loss measurement system 63 may measure the difference between the hydraulic pressure between the input and the output of each of the first motor 20 and the second motor 21. In another example, the power loss measurement system 63 may measure the difference between the hydraulic pressure between the input and the output of each of the first pump 16 and the second pump 17 together with an estimate of line losses between each pump and its respective motor. In still another embodiment, the power loss measurement system 63 may measure the difference between the input and the output of a torque converter used to drive the machine 10.

At optional stage 78, the pitch or inclination of the machine 10 may be used to determine the change in power due to the change in elevation or grade of the machine 10 due to the incline on which the machine 10 is operating ($P_{Grade}$). More specifically, the change in power due to the incline ($P_{Grade}$) may be determined as follows:

$$P_{Grade} = m * g * V * \sin(\alpha), \tag{4}$$

where m is the mass of the machine 10, g is the force of gravity, V is the velocity of the machine 10, and $\alpha$ is the angle of the machine 10 relative to gravity. The tire pressures and/or tire characteristic data 55 of deflectable tires 15 may also be incorporated into the determination of $P_{Grade}$.

Power lost due to friction ($P_{Friction}$) caused by movement of the machine 10 and changes in tire pressure and/or tire characteristic data 55 may be determined at stage 79 based on the friction loss characteristics generated at stage 70. More specifically, the speed of the machine 10 may be used to determine the corresponding power required to overcome the friction losses ($P_{Friction}$) of the machine 10 as it moves along the work surface 102. Furthermore, any variations in tire pressures of the deflectable tires 15 (e.g., due to the work material 101 of the work surface 102 on which the machine 10 is working and how the work material 101 can create different amounts of deflection in the deflectable tires 15, a temperature change of the deflectable tires 15 due to the environment of the work site 100 (solar gain, exposure to heat rejection from machine), etc.) can also be incorporated into the power lost due to friction ($P_{Friction}$) determination. In this manner, deviations in the tire pressures of the deflectable tires 15 on the work surface 102 as compared to the nominal tire pressures of the deflectable tires 15 during the calibration process 69 can be taken into consideration, helping to more accurately determine $P_{Friction}$, and, correspondingly, $P_{Actual}$.

In some instances, the power lost due to friction ($P_{Friction}$) associated with the machine 10 as it moves may not be specifically calculated as part of equation (1) or equation (2). In such case, the friction loss characteristics determined in staged 70 do not need to be stored within controller 51, nor are the friction loss characteristics calculated. With such alternate procedure, as the desired actual drive power ($P_{Actual}$) is determined at stage 72, the operator or the machine 10 may note or store the speed of operation during such process. When operating the machine 10 at the work site 100, if the machine 10 is moved at the same speed as the machine 10 was operating during the calibration process 69 while determining the desired actual drive power ($P_{Actual}$), and the tire pressure of the deflectable tires 15 is equal to the nominal tire pressure, the friction loss characteristics will be the same during the process of determining the desired actual drive power and determining the actual drive power at the work site 100. As such, the state of compaction system 52 will achieve consistent results provided that the speed of the machine 10 does not change while determining the actual drive power ($P_{Actual}$). In other words, since the power lost due to friction ($P_{Friction}$) is a function of the speed of the machine 10, the friction loss characteristics will be the same while determining the desired actual drive power ($P_{Actual}$) and while operating at the work site 100, provided that the machine 10 is operating at a consistent speed. In such case, $P_{Friction}$ goes to zero, and equation (2) reduces to the following:

$$P_{Actual} = P_{Gross} - P_{Grade} + P_{Vibe} \tag{5}$$

The vibration compensation factor ($P_{Vibe}$) may optionally be determined at stage 80. As stated herein, the vibration compensation factor ($P_{Vibe}$) may be used to adjust the state of compaction system 52 to adjust for use of vibration system 30. For example, under some operating conditions, use of the vibration system 30 may decrease the actual drive power ($P_{Actual}$) as determined by equation (1) and displayed on display 48 and/or at command center 105. Accordingly, the vibration compensation factor ($P_{Vibe}$) may be used to improve accuracy of the actual drive power ($P_{Actual}$) calculation regardless of whether the vibration system 30 is being operated.

In one example, a map of various vibration compensation factors ($P_{Vibe}$) may be generated and stored within controller 51 by operating the machine 10 on a specific area or location of a work surface 102, both with and without the vibration system 30 operating. The actual drive power ($P_{Actual}$) may be recorded together with the frequency and amplitude of the vibration system 30. This process may be repeated for a plurality of different frequencies and amplitudes. Other factors, such as the type of work material 101, the speed of machine 10, and the state of compaction of the work material 101, may also affect the vibration compensation factor ($P_{Vibe}$), and may be stored as part of the data map of vibration compensation factors ($P_{Vibe}$). It is contemplated that other factors may also affect the vibration compensation factor ($P_{Vibe}$). In operation, the controller 51 may use all of the factors used to generate the map of vibration compensation factors ($P_{Vibe}$) to determine the relevant vibration compensation factor at stage 80.

In an alternate embodiment, the vibration compensation factor ($P_{Vibe}$) may be determined based on the pressure within the vibration system 30. More specifically, as the work material 101 is compacted and becomes stiffer, the pressure within the first vibration system hydraulic line 35 and the second vibration system hydraulic line 36 may increase. Hydraulic sensor 67 may be operatively associated with the vibration system 30 to determine the pressure of the relevant hydraulic line. It is believed that a correlation may be determined between the hydraulic pressure and the vibration compensation factor ($P_{Vibe}$). Accordingly, a data map of vibration compensation factors ($P_{Vibe}$) corresponding to different hydraulic pressures within the vibration system 30 may also be generated and stored within controller 51 in a manner similar to that described above. It is believed that it may be possible to use the change in pressure together with the frequency and amplitude of the vibration system 30 to further increase the accuracy of the actual drive power ($P_{Actual}$) calculation.

At stage 81, the controller may determine the actual drive power ($P_{Actual}$) according to equation (3), (1), (5), or (2), where the gross power ($P_{Gross}$) is determined at stage 77, the grade power ($P_{Grade}$) is determined at stage 78, the friction loss power ($P_{Friction}$) is determined at stage 79, and the vibration compensation factor ($P_{Vibe}$) is determined at stage 80.

It should be noted that while the change in power due to the change in elevation ($P_{Grade}$) is subtracted in equations (1), (5), and (2), that change in power is either added or subtracted based on whether the machine 10 is moving up or down a grade, respectively. Further, while the vibration compensation factor ($P_{Vibe}$) is indicated as being added to equation (1) to establish equation (2), there may be instances in which the vibration compensation factor is negative and reduces the actual drive power ($P_{Actual}$) in equations (2) and/or (5).

The actual drive power ($P_{Actual}$) may be stored at stage 82 and displayed on display 48 and/or at command center 105 at stage 83. Optionally, at first decision stage 84, the controller 51 may determine whether the actual drive power ($P_{Actual}$) is equal to the desired actual drive power determined in stage 72. If the actual drive power ($P_{Actual}$) is not equal the desired actual drive power, the operator may continue to operate machine 10 at stage 74, and the compaction operation starting at stage 74 can be repeated. If the actual drive power ($P_{Actual}$) does equal the desired actual drive power at first decision stage 84, the operator may move the machine 10 to a new location (e.g., at work site 100) and begin a new compacting process, if desired.

Other variations of the preceding stages are also possible and within the scope of the present disclosure. For example, various stages could be omitted and/or reordered without departing from the scope of the present disclosure.

Figure 5:
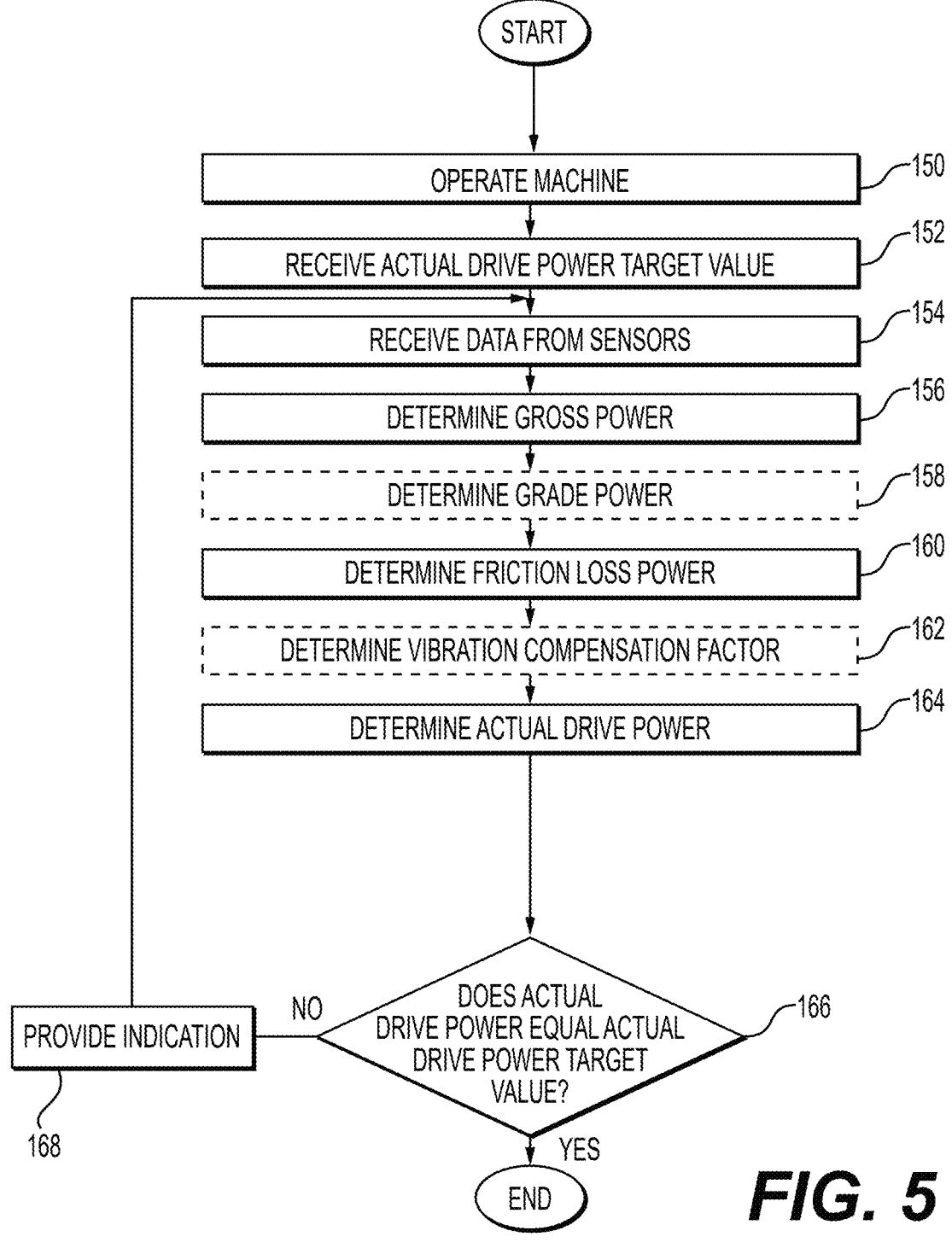
FIG. 5 shows a flowchart of another process for determining a state of compaction of a work surface during a compaction operation.

FIG. 5 depicts another process for determining a state of compaction of a work material 101 during a compaction operation using state of compaction system 52 in conjunction with the operation of machine 10. Although this process can include calibration process 69, discussion of that inclusion is omitted for clarity.

At stage 150, the machine 10 may begin a compaction operation of the work material 101. At stage 152, the controller 51 may receive an actual drive power target value 68 corresponding to a desired state of compaction of work material 101. Actual drive power target value 68 may be input into controller 51 via, for example, display 48 by an operator of machine 10, command center 105 over wireless network system 106 by an operator who may be remote from site 100, etc.

As the machine 10 operates, the controller 51 may receive data from the various sensors at stage 154. More specifically, the controller 51 may determine the tire pressure and/or tire characteristic data 55 of the deflectable tires 15 from the tire sensing system 53. The controller 51 may also determine the position of the machine 10 based on position signals from the position sensing system 56 and the speed at which the machine 10 is operating based on speed signals from the drive speed sensing system 58. In addition, the controller 51 may determine the pitch angle or inclination and/or pitch rate of the machine 10 based on inclination signals from the inclination sensing system 60. If desired, the controller 51 may also determine the pressure of the hydraulic fluid within the vibration system 30 based on signals from hydraulic sensor 67.

At stage 156, the controller 51 may determine the amount of gross power used to propel the machine 10 ($P_{Gross}$) along the work surface 102 as the machine 10 moves over work material 101. In doing so, the controller 51 may utilize the power loss measurement system 63 as described above.

At optional stage 158, the pitch or inclination of the machine 10 may be used to determine the change in power due to the change in elevation or grade of the machine 10 due to the incline on which the machine 10 is operating ($P_{Grade}$). The change in power due to the incline ($P_{Grade}$) may be determined according to equation (4). The tire pressures and/or tire characteristic data 55 of deflectable tires 15 may also be incorporated into the determination of $P_{Grade}$.

Power lost due to friction ($P_{Friction}$) caused by movement of the machine 10 and changes in tire pressure and/or tire characteristic data 55 may be determined at stage 160. More specifically, the speed of the machine 10 may be used to determine the corresponding power required to overcome the friction losses ($P_{Friction}$) of the machine 10 as it moves over work material 101. Furthermore, any variations in tire pressures of the deflectable tires 15 (e.g., due to the work material 101 of the work surface 102 on which the machine 10 is working, and how the work material 101 can create different amounts of deflection in the deflectable tires 15; a temperature change of the deflectable tires 15 due to the environment of the work site 100 (solar gain, exposure to heat rejection from machine); etc.) can also be incorporated into the power lost due to friction ($P_{Friction}$) determination.

The vibration compensation factor ($P_{Vibe}$) may optionally be determined at stage 162. As discussed herein, the vibration compensation factor ($P_{Vibe}$) may be used by the state of compaction system 52 to adjust for use of vibration system 30. For example, under some operating conditions, use of the vibration system 30 may decrease the actual drive power ($P_{Actual}$) as determined by equation (1) and displayed on display 48 and/or at command center 105. Accordingly, the vibration compensation factor ($P_{Vibe}$) may be used to improve accuracy of the actual drive power ($P_{Actual}$) calculation regardless of whether the vibration system 30 is being operated.

At stage 164, the controller 51 may determine the actual drive power ($P_{Actual}$) according to equation (3), (1), (5), or (2), where the gross power ($P_{Gross}$) is determined at stage 156, the grade power ($P_{Grade}$) is determined at stage 158, the friction loss power ($P_{Friction}$) is determined at stage 160, and the vibration compensation factor ($P_{Vibe}$) is determined at stage 162.

At stage 166, the controller 51 may determine if there is a deviation 204 between the actual drive power ($P_{Actual}$) and the actual drive power target value 68 that was inputted into controller 51. If there is no deviation 204 between the actual drive power ($P_{Actual}$) and the actual drive power target value 68, the state of compaction of work material 101 matches the desired state of compaction corresponding to actual drive power target value 68. In other words, work material 101 is not over-compacted or under-compacted relative to the desired compaction level, but is instead compacted to the desired level. If, however, there is a deviation 204 between the actual drive power ($P_{Actual}$) and the actual drive power target value 68, the state of compaction of work material 101 does not match the desired state of compaction corresponding to actual drive power target value 68, meaning that the work material 101 is either over-compacted or under-compacted relative to the desired compaction level. In this case, at stage 168 the controller 51 provides an indication 202 to an operator of machine 10. After stage 168, the operator may use machine 10 to continue the compacting process, if desired, in an effort to eliminate the deviation 204 between the actual drive power ($P_{Actual}$) and the actual drive power target value 68.

Other variations of the preceding stages are also possible and within the scope of the present disclosure. For example, various stages could be omitted and/or reordered without departing from the scope of the present disclosure.

Figure 6:
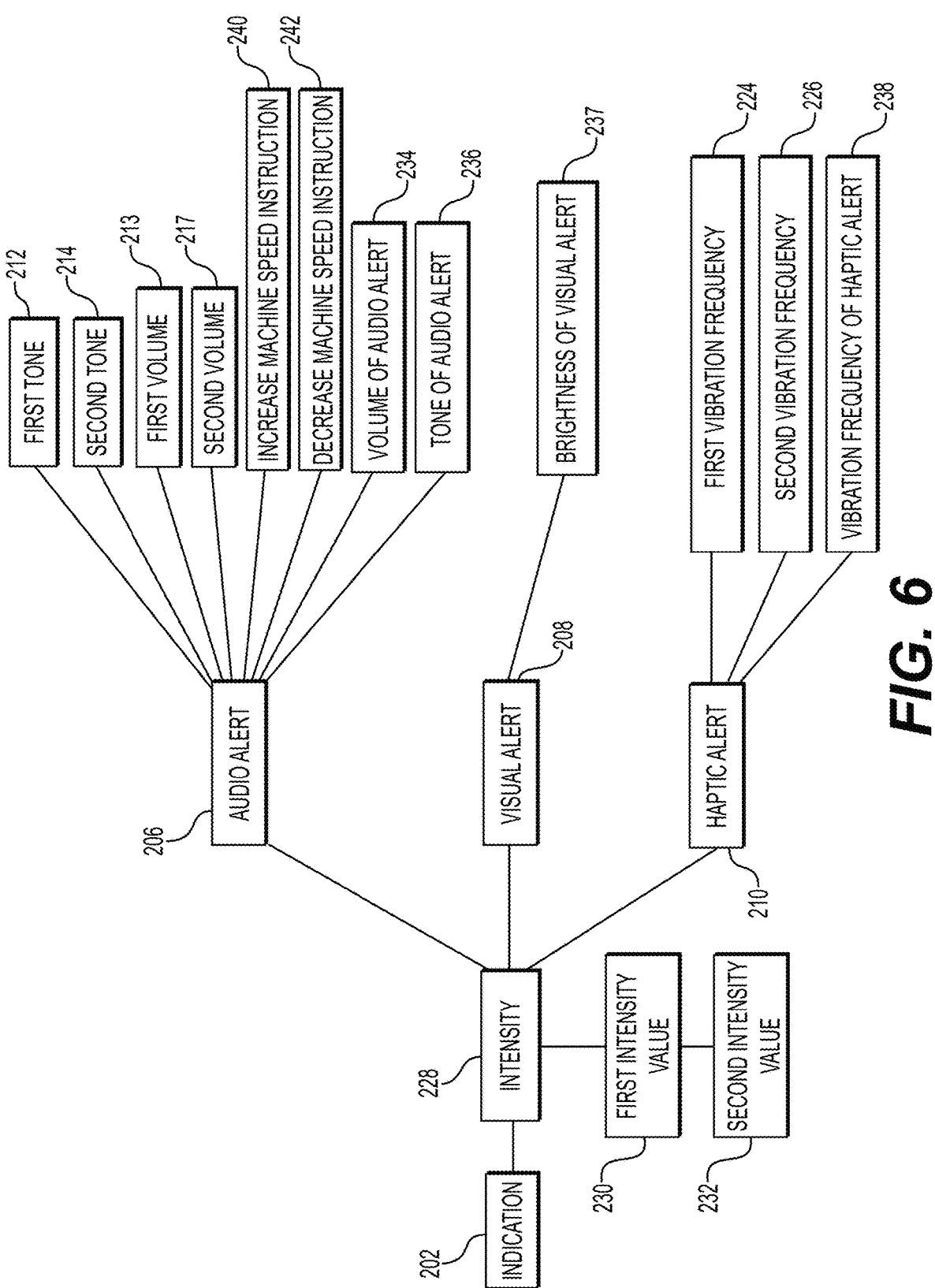
FIG. 6 shows various aspects of an indication provided when determining a state of compaction of a work surface during a compaction operation.

FIGS. 6-8 depict different aspects of the process of FIG. 5.

As shown in FIG. 6, indication 202 can be one or more of an audio alert 206, a visual alert 208, and a haptic alert 210. If indication 202 is an audio alert 206, the audio alert 206 can be a first tone 212 and/or be at a first volume 213. The audio alert 206 may include such features if the deviation 204 has a first deviation value 214, as shown in FIG. 7. Additionally, the audio alert 206 can be a second tone 216 and/or be at a second volume 217. The second tone 216 and second volume 217 may be different than the first tone 212 and first volume 213, respectively. The audio alert 206 may include such features if the deviation 204 has a second deviation value 218, as shown in FIG. 7, the second deviation value 218 being different than the first deviation value 214.

Turning to FIG. 7, the first deviation value 214 corresponds to a first state of compaction of the work material 101. The second deviation value 218 corresponds to a second state of compaction of the work material 101. The second state of compaction of the work material 101 is different than the first state of compaction of the work material 101.

For example, the first deviation value 214 could correspond to the work surface 101 being compacted to 97% of actual drive power target value 68 (i.e., slightly under-compacted), whereas the second deviation value 218 could correspond to the work surface 101 being compacted to 128% of actual drive power target value 68 (i.e., significantly over-compacted). In such a situation, the first tone 212 could be a low-pitched tone (indicating under-compaction), with the first volume 213 possibly being a low volume (indicating a small deviation from the actual drive power target value 68), whereas the second tone 216 could be a high-pitched tone (indicating over-compaction), with the second volume 217 possibly being a high volume (indicating a significant deviation from the actual drive power target value 68).

As another example, different tones alone (i.e., different tones, but all at the same volume) could be used to indicate different states of compaction of work material 101. For instance, as with the above example, the first deviation value 214 could correspond to the work surface 101 being compacted to 97% of actual drive power target value 68 (i.e., slightly under-compacted), whereas the second deviation value 218 could correspond to the work surface 101 being compacted to 128% of actual drive power target value 68 (i.e., significantly over-compacted). In such a situation, the first tone 212 could be a high-pitched tone (indicating under-compaction), whereas the second tone 216 could be a low-pitched tone (indicating over-compaction).

In this manner, the audio alert 206 may indicate various states of compaction of the work material 101 to the operator of the machine 10 without the operator needing to look down at a display, such as display 48. The operator can therefore maintain focus on operating machine 10 to perform an effective compaction operation rather than being distracted by a display of the actual drive power ($P_{Actual}$).

Various other combinations of tones and/or volumes of audio alert 206 are contemplated and within the scope of the present application.

Returning to FIG. 6, indication 202 could also be a haptic alert 210 capable of being emitted at various vibration frequencies 238. For example, the haptic alert 210 could be at a first vibration frequency 224 if the deviation 204 has a first deviation value 214. The haptic alert 210 could be at a second vibration frequency 226 if the deviation 204 has a second deviation value 218. The second vibration frequency 226 is different than the first vibration frequency 224. For example, the first vibration frequency 224 could be 60 Hz and the second vibration frequency 226 could be 500 Hz.

As discussed above in the context of audio alert 206, the second deviation value 218 is different than the first deviation value 214. In this manner, the haptic alert 210 may be used to indicate to the operator of the machine 10 various states of compaction of work material 101 (e.g., significantly under-compacted, moderately over-compacted, etc.) through haptic feedback. For example, different vibration frequencies 238 could be used to indicate a magnitude of the difference between deviation 204 and first deviation value 214 and/or indicate a magnitude of the difference between deviation 204 and second deviation value 218. In one embodiment, a higher frequency could correspond to a higher magnitude, and a lower frequency could correspond to a lower magnitude. As another example, different vibration frequencies 238 could be used to indicate either under-compaction or over-compaction.

The haptic alert 210 may be emitted so as to capture the attention of the operator of the machine 10. For example, the haptic alert 210 may be emitted through the operator seat 42 of the machine 10. The haptic alert 210 could also be emitted through the steering input 49 of the machine 10.

In this manner, the haptic alert 210 may indicate various states of compaction of the work material 101 to the operator of the machine 10 without the operator needing to look down at a display, such as display 48. The operator can therefore maintain focus on operating machine 10 to perform an effective compaction operation rather than being distracted by a display of the actual drive power ($P_{Actual}$).

In an embodiment, the controller 51 may adjust an intensity 228 of the indication 202, as shown in FIG. 6. The intensity 228 of the indication 202 may correspond to, for example, a volume of an audio alert 234, a tone of an audio alert 236, a brightness of a visual alert 237, and/or a vibration frequency of a haptic alert 238. Other forms of intensity 228 are contemplated and within the scope of the present application. For example, if the deviation 204 has a first deviation value 214, the controller 51 may adjust intensity 228 of the indication 202 to a first intensity value 230. If the deviation 204 has a second deviation value 218, the second deviation value 218 being different than the first deviation value 214, the controller 51 may adjust the intensity 228 of the indication 202 to a second intensity value 232 different than the first intensity value 230.

In an embodiment, the second deviation value 218 could be greater than the first deviation value 214, and the second intensity value 232 could be greater than the first intensity value 230. In this manner, the controller 51 may indicate a greater state of compaction of work material 101 for the second deviation value 218 through the (greater) second intensity value 232, and a lesser state of compaction of work material 101 for the first deviation value 214 through the (lesser) first intensity value 230.

Controller 51 may also be configured to provide instructions to an operator of the machine 10 regarding a speed of the machine 10, as shown in FIG. 6. For example, if the actual drive power ($P_{Actual}$) is greater than the actual drive power target value 68, the indication 202 could be an increase machine speed instruction 240, which may be delivered to the operator of the machine 10. In response, the operator can increase the speed of the machine 10, which will result in less compaction of work material 101. Alternatively, if the actual drive power ($P_{Actual}$) is less than the actual drive power target value 68, the indication 202 could be a decrease machine speed instruction 242, which may be delivered to the operator of the machine 10. In response, the operator can decrease the speed of the machine 10, which will result in greater compaction of work material 101. Although FIG. 6 shows the increase machine speed instruction 240 and the decrease machine speed instruction 242 being an audio alert 206, it is contemplated that the increase machine speed instruction 240 and decrease machine speed instruction 242 taking other forms, such as, for example, a visual alert 208 or a haptic alert 210, among others.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

INDUSTRIAL APPLICABILITY

In general, the systems, methods, and controllers of the present application provide an ability to determine a state of compaction of a work material while minimizing distraction of the operator of the compaction machine from effectively completing a compaction operation. In particular, the systems, methods, and controllers of the present application provide an indication to the operator of the machine, such as an audio, visual, or haptic alert to convey information relating to the compaction operation. The indication is customizable in various ways to provide more granular information to the operator, all without requiring the operator to look down at a display, which would distract the operator from completing the compaction operation.

What is claimed is:

1. A system for determining a state of compaction of a work material during a compaction operation, the system comprising:

a roller associated with a machine and configured to engage and compact the work material;

a power loss sensor configured to generate power loss signals indicative of a power loss of the machine;

a speed sensor configured to generate speed signals indicative of a speed of the machine; and a controller configured to:

receive an actual drive power target value, receive the power loss signals from the power loss sensor, receive the speed signals from the speed sensor, determine a gross power of the machine based on the power loss signals, determine a friction loss power of the machine based on the speed signals, determine an actual drive power of the machine based on the gross power and the friction loss power, the actual drive power corresponding to the state of compaction of the work material, and

21 provide an indication to an operator of the machine upon a deviation between the actual drive power and the actual drive power target value.

2. The system of claim 1, wherein the indication comprises at least one of:

an audio alert, a visual alert, and a haptic alert.

3. The system of claim 2, wherein the indication comprises the audio alert, wherein the audio alert comprises a first tone and/or first volume if the deviation has a first deviation value, and wherein the audio alert comprises a second tone and/or second volume different than the first tone/first volume if the deviation has a second deviation value different than the first deviation value.

4. The system of claim 3, wherein the first deviation value corresponds to a first state of compaction of the work material, and wherein the second deviation value corresponds to a second state of compaction of the work material different than the first state of compaction of the work material.

5. The system of claim 2, wherein the indication comprises the haptic alert, wherein the haptic alert comprises a first vibration frequency if the deviation has a first deviation value, and wherein the haptic alert comprises a second vibration frequency different than the first vibration frequency if the deviation has a second deviation value different than the first deviation value.

6. The system of claim 5, wherein the first deviation value corresponds to a first state of compaction of the work material, and wherein the second deviation value corresponds to a second state of compaction of the work material different than the first state of compaction of the work material.

7. The system of claim 5, wherein the haptic alert is emitted through at least one of:

an operator seat of the machine, and a steering input of the machine.

8. The system of claim 1, wherein, if the deviation has a first deviation value, the controller is configured to adjust an intensity of the indication to a first intensity value, and wherein, if the deviation has a second deviation value different than the first deviation value, the controller is configured to adjust the intensity of the indication to a second intensity value different than the first intensity value.

9. The system of claim 8, wherein the second deviation value is greater than the first deviation value, and wherein the second intensity value is greater than the first intensity value.

10. The system of claim 8, wherein the intensity of the indication comprises at least one of:

a tone of an audio alert, a volume of an audio alert, a brightness of a visual alert, and a vibration frequency of a haptic alert.

11. The system of claim 1, wherein, if the actual drive power is greater than the actual drive power target value, the indication comprises an increase machine speed instruction, and wherein, if the actual drive power is less than the actual drive power target value, the indication comprises a decrease machine speed instruction.

12. The system of claim 1, wherein the actual drive power target value comprises an actual drive power target range having a lower bound and an upper bound.

13. The system of claim 12, wherein the lower bound and upper bound are adjustable.

14. A method for determining a state of compaction of a work material during a compaction operation by a machine, the machine having a roller for engaging and compacting the work material, the method comprising:

receiving an actual drive power target value;

receiving power loss signals indicative of a power loss of the machine;

receiving speed signals indicative of a speed of the machine;

determining a gross power of the machine based on the power loss signals;

determining a friction loss power of the machine based on the speed signals;

determining an actual drive power of the machine based on the gross power and the friction loss power, the actual drive power corresponding to the state of compaction of the work material; and providing an indication to an operator of the machine upon a deviation between the actual drive power and the actual drive power target value.

15. The method of claim 14, wherein the indication comprises at least one of:

an audio alert, a visual alert, and a haptic alert.

16. The method of claim 15, wherein the indication comprises the audio alert, wherein the audio alert comprises a first tone and/or first volume if the deviation has a first deviation value, the first deviation value corresponding to a first state of compaction of the work material, and wherein the audio alert comprises a second tone and/or second volume different than the first tone/first volume if the deviation has a second deviation value different than the first deviation value, the second deviation value corresponding to a second state of compaction of the work material different than the first state of compaction of the work material.

17. The method of claim 15, wherein the indication comprises the haptic alert, wherein the haptic alert comprises a first vibration frequency if the deviation has a first deviation value corresponding to a first state of compaction of the work material, and wherein the haptic alert comprises a second vibration frequency different than the first vibration frequency if the deviation has a second deviation value different than the first deviation value, the second deviation value corresponding to a second state of compaction of the work material different than the first state of compaction of the work material.

18. A controller for determining a state of compaction of a work material during a compaction operation by a machine, the machine having a roller for engaging and compacting the work material, the controller being configured to:

receive an actual drive power target value;

receive power loss signals indicative of a power loss of the machine;

receive speed signals indicative of a speed of the machine;

determine a gross power of the machine based on the power loss signals;

determine a friction loss power of the machine based on the speed signals;

determine an actual drive power of the machine based on the gross power and the friction loss power, the actual drive power corresponding to the state of compaction of the work material; and provide an indication to an operator of the machine upon a deviation between the actual drive power and the actual drive power target value.

19. The controller of claim 18, wherein the actual drive power target value comprises an actual drive power target range having an adjustable lower bound and an adjustable upper bound.

20. The controller of claim 18, wherein, if the deviation has a first deviation value, the controller is configured to adjust an intensity of the indication to a first intensity value, wherein, if the deviation has a second deviation value different than the first deviation value, the controller is configured to adjust the intensity of the indication to a second intensity value different than the first intensity value, wherein the intensity of the indication comprises at least one of:

a volume of an audio alert, a tone of an audio alert, a brightness of a visual alert, and a vibration frequency of a haptic alert.

\* \* \* \* \*